(12) United States Patent
Yahata

(10) Patent No.: US 11,055,564 B2
(45) Date of Patent: Jul. 6, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Kazuhiro Yahata, Kunitachi (JP)

(73) Assignee: Canon Kabushiki Kaisha, Tokyo (JP)

(*) Notice: Subject to any disclaimer, the term of this patent is extended or adjusted under 35 U.S.C. 154(b) by 141 days.

(21) Appl. No.: 16/201,740

(22) Filed: Nov. 27, 2018

(65) Prior Publication Data
US 2019/0164008 A1 May 30, 2019

(30) Foreign Application Priority Data
Nov. 30, 2017 (JP) .............................. JP2017-231082

(51) Int. Cl.
*G06K 9/62* (2006.01)
*G06T 5/20* (2006.01)
*G06T 5/00* (2006.01)

(52) U.S. Cl.
CPC ......... *G06K 9/6214* (2013.01); *G06K 9/6215* (2013.01); *G06T 5/002* (2013.01); *G06T 5/20* (2013.01); *G06T 2207/20076* (2013.01)

(58) Field of Classification Search
CPC . G06T 5/002; G06T 5/20; G06T 2207/20012; G06T 2207/10024;
(Continued)

(56) References Cited

U.S. PATENT DOCUMENTS

| 2014/0226905 A1* | 8/2014 | Yahata | G06K 9/6202 382/194 |
| 2014/0334701 A1* | 11/2014 | Ye | G06T 11/006 382/131 |

(Continued)

FOREIGN PATENT DOCUMENTS

JP        2013026669 A       2/2013

OTHER PUBLICATIONS

Mark Lebrun, Implementation of the "Non-Local Bayes" (NL-Bayes) Image Denoising Algorithm, Image Processing On Line, (2013), pp. 1 to 42.

*Primary Examiner* — Golam Sorowar
(74) *Attorney, Agent, or Firm* — Canon U.S.A., Inc. I.P. Division

(57) ABSTRACT

An image processing apparatus includes a setting unit, a detection unit, a matrix calculation unit, a calculation unit, an obtaining unit, a deriving unit, a patch correction unit, and a generation unit. The setting unit sets a target patch in an input image. The detection unit detects a plurality of similar patches in the input image. The matrix calculation unit calculates a covariance matrix representing correlation between pixels based on the plurality of similar patches. The calculation unit calculates eigenvalues and eigenvectors of the covariance matrix. The obtaining unit obtains a noise amount in the input image. The deriving unit derives a correction matrix based on the eigenvalues, the eigenvectors, the noise amount, and the number of similar patches. The patch correction unit corrects values of pixels in the similar patches based on the correction matrix. The generation unit generates an output image by combining the corrected similar patches.

17 Claims, 11 Drawing Sheets

(58) Field of Classification Search
CPC ......... G06T 2207/20192; G06T 3/4053; G06T 2207/20081; G06T 5/003; G06T 5/50; G06T 2207/20076; G06T 2207/20016; G06T 2207/20021; G06T 5/001; G06T 7/90; G06T 2207/20028; G06T 3/40; G06T 2200/04; G06T 2207/10081; H04N 1/409; H04N 1/4092; H04N 5/357; H04N 9/045; H04N 9/04557; H04N 1/58; H04N 9/04515; H04N 9/646; H04N 1/4097; H04N 5/217; H04N 5/361; H04N 5/367; H04N 5/374; H04N 19/97; H04N 1/40; H04N 1/40062; H04N 1/401; H04N 1/405; H04N 1/4051; G06K 9/40; G06K 9/6215; G06K 9/52; G06K 9/4642; G06K 9/6202; G06K 9/6247; G06K 9/00275; G06K 9/6218; G06K 9/66; G06K 15/1822; G06K 15/1877; G06K 9/38; G06K 9/46; G06K 9/4609; G06K 9/4633; G06K 9/4661; G06K 9/4671; G06K 9/6212; G06K 9/6255

See application file for complete search history.

(56) References Cited

U.S. PATENT DOCUMENTS

| | | | | |
|---|---|---|---|---|
| 2014/0347526 | A1* | 11/2014 | Hara | G06T 5/002 348/241 |
| 2015/0287171 | A1* | 10/2015 | Hiasa | G06T 5/20 382/195 |
| 2015/0348248 | A1* | 12/2015 | Shibata | G06T 5/003 382/260 |
| 2017/0161750 | A1* | 6/2017 | Yao | G06Q 20/40145 |
| 2017/0302867 | A1* | 10/2017 | Ichikawa | H04N 5/232 |
| 2018/0068634 | A1* | 3/2018 | Yoo | G09G 5/006 |

\* cited by examiner

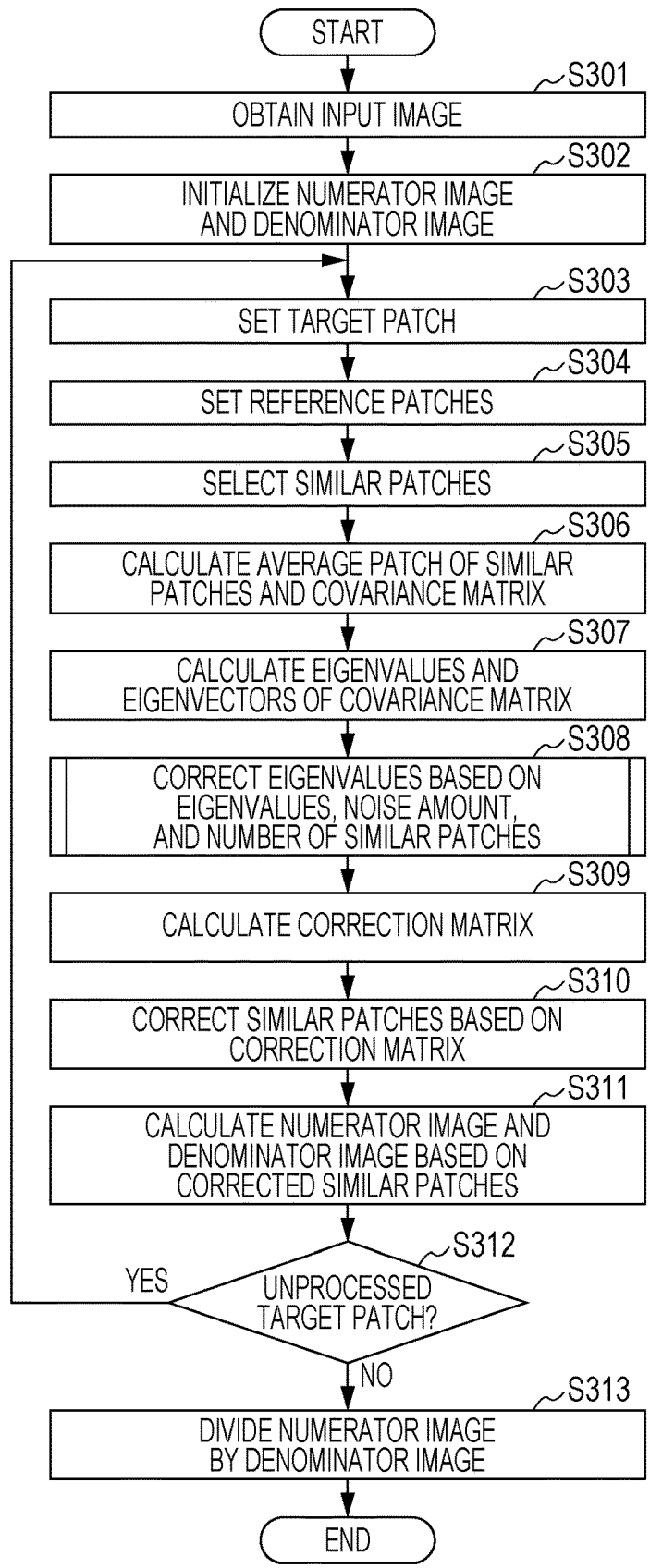

IMAGE PROCESSING APPARATUS, IMAGE PROCESSING METHOD, AND STORAGE MEDIUM

BACKGROUND OF THE INVENTION

Field of the Disclosure

The present disclosure relates to a technique of reducing noise in an image.

Description of the Related Art

Digital images captured by an imaging apparatus or the like includes noise. Therefore, a noise reduction process of reducing noise in an image has been generally used. The noise reduction process employs a method for reducing noise based on a target patch. The patch is formed by a plurality of pixels in an image. In the method disclosed in implementation of the "Non-Local Bayes" (NL-Bayes) Image Denoising Algorithm, Image Processing On Line, 3 (2013), pp. 1 to 42, a group of patches is selected in an image, a probability model of a patch represented by an average of the patches and a covariance matrix is generated, and a noise reduction process is performed on all the patches based on maximum a posteriori probability. Then a combining process which is called aggregation is performed on a patch having reduced noise so that an image having reduced noise is generated. Furthermore, in a method disclosed in Japanese Patent Laid-Open No. 2013-026669, first, an average and a covariance matrix of a patch group in an image are calculated, and thereafter, eigenvalues and eigenvectors of the covariance matrix are calculated. After the calculation, a basic matrix is generated based on the eigenvalues and the eigenvectors and a patch projection process is performed using the base matrix so that the noise reduction process is performed on all the patches included in the patch group. As described in Implementation of the "Non-Local Bayes" (NL-Bayes) Image Denoising Algorithm, Image Processing On Line, 3 (2013), pp. 1 to 42, the process of combining patches which have been subjected to the noise reduction process is performed so that an image having reduced noise is generated.

SUMMARY OF THE INVENTION

In such a general noise reduction method based on a patch, patterned noise may be generated in an output image. Therefore, the present disclosure is provided to realize a noise reduction process based on a patch for suppressing generation of patterned noise.

According to an aspect of the present disclosure, an image processing apparatus includes a setting unit configured to set a target patch in an input image, a detection unit configured to detect a plurality of similar patches which are similar to the target patch set in the input image, a matrix calculation unit configured to calculate a covariance matrix representing correlation between pixels based on the plurality of similar patches, a calculation unit configured to calculate a plurality of eigenvalues and a plurality of eigenvectors of the covariance matrix, an obtaining unit configured to obtain a noise amount in the input image, a deriving unit configured to derive a correction matrix based on the plurality of eigenvalues, the plurality of eigenvectors, the noise amount, and the number of similar patches, wherein the correction matrix is different from the calculated covariance matrix, a patch correction unit configured to correct values of pixels in at least one of the plurality of similar patches based on the correction matrix, and a generation unit configured to generate an output image by combining the similar patches corrected by the patch correction unit.

Further features of the present disclosure will become apparent from the following description of embodiments with reference to the attached drawings.

BRIEF DESCRIPTION OF THE DRAWINGS

FIG. 3 is a flowchart of a flow of a noise reduction process.

DESCRIPTION OF THE EMBODIMENTS

Hereinafter, embodiments of the present disclosure will be described with reference to the accompanying drawings. Note that configurations described in the embodiments below are merely examples, and the present disclosure is not limited to the illustrated configurations.

Figure 1:
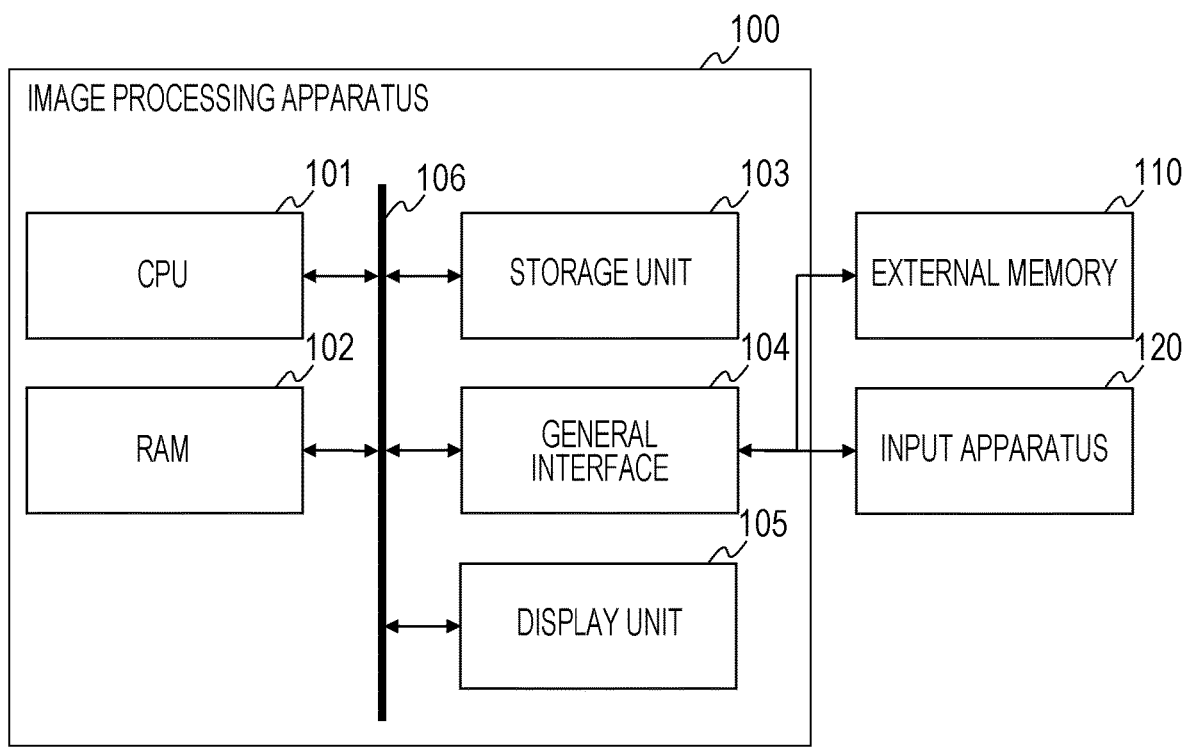
FIG. 1 is a block diagram illustrating a hardware configuration of an image processing apparatus.

In the first embodiment, a mode for realizing an image processing apparatus which executes a noise reduction process based on a patch will be described. FIG. 1 is a block diagram illustrating a hardware configuration of an image processing apparatus according to this embodiment. An image processing apparatus 100 includes a central processing unit (CPU) 101, a random access memory (RAM) 102, a storage unit 103, a general interface 104, and a display unit 105 which are connected to one another through a main bus 106. The image processing apparatus 100 is connected to an external memory 110 and an input device 120 including a mouse and a keyboard through the general interface 104. The storage unit 103 is a storage device, such as a hard disk drive (HDD) or a solid state drive (SSD). The display unit 105 is a liquid crystal display or an organic electroluminescence (EL) display.

Hereinafter, various processes which are realized when the CPU 101 operates various software (computer programs) stored in the storage unit 103 will be described. First, the CPU 101 activates an image processing program stored in the storage unit 103, develops the image processing program in the RAM 102, and displays a user interface screen (hereinafter referred to as a "UI screen") in the display unit

105. Subsequently, the CPU 101 reads an input image stored in the external memory 110 into the RAM 102 in accordance with a user instruction issued through the input device 120. Furthermore, the CPU 101 performs a noise reduction process on the input image stored in the RAM 102 in accordance with a user instruction. The image which has been subjected to the noise reduction process is stored in the RAM 102 again. The image which has been subjected to the noise reduction process and stored in the RAM 102 is output to the display unit 105 or the external memory 110 in accordance with a user instruction. Note that the input image to be subjected to the noise reduction process may be stored in the storage unit 103 instead of the external memory 110 or may be read from a server into the RAM 102 through a network not illustrated.

Here, the noise reduction process based on a patch will be briefly described. A patch consisting of a plurality of pixels including a target pixel in an input image is referred to as a target patch. A plurality of pixels in the vicinity of the target pixel is individually referred to as reference pixels, and each of patches corresponding to one of the reference pixels is referred to a "reference patch". The reference patch is consisted of a plurality of pixels including a reference pixel. The reference patches are referred for performing the noise reduction process on the target patch. Since a plurality of reference pixels is set for one target pixel, a plurality of reference patches is provided for one target pixel. In the noise reduction process based on patches, reference patches which have a pixel value distribution similar to that of the target patch are selected as similar patches and determined as a patch group. Note that the target patch may be included in the plurality of reference patches. The noise reduction process is performed on the individual similar patches based on a patch group. The similar patches having reduced noise are combined with one another. In this way, an image with noise reduction processing applied to the input image is generated by combining similar patches with reduced noise.

Figure 2A:
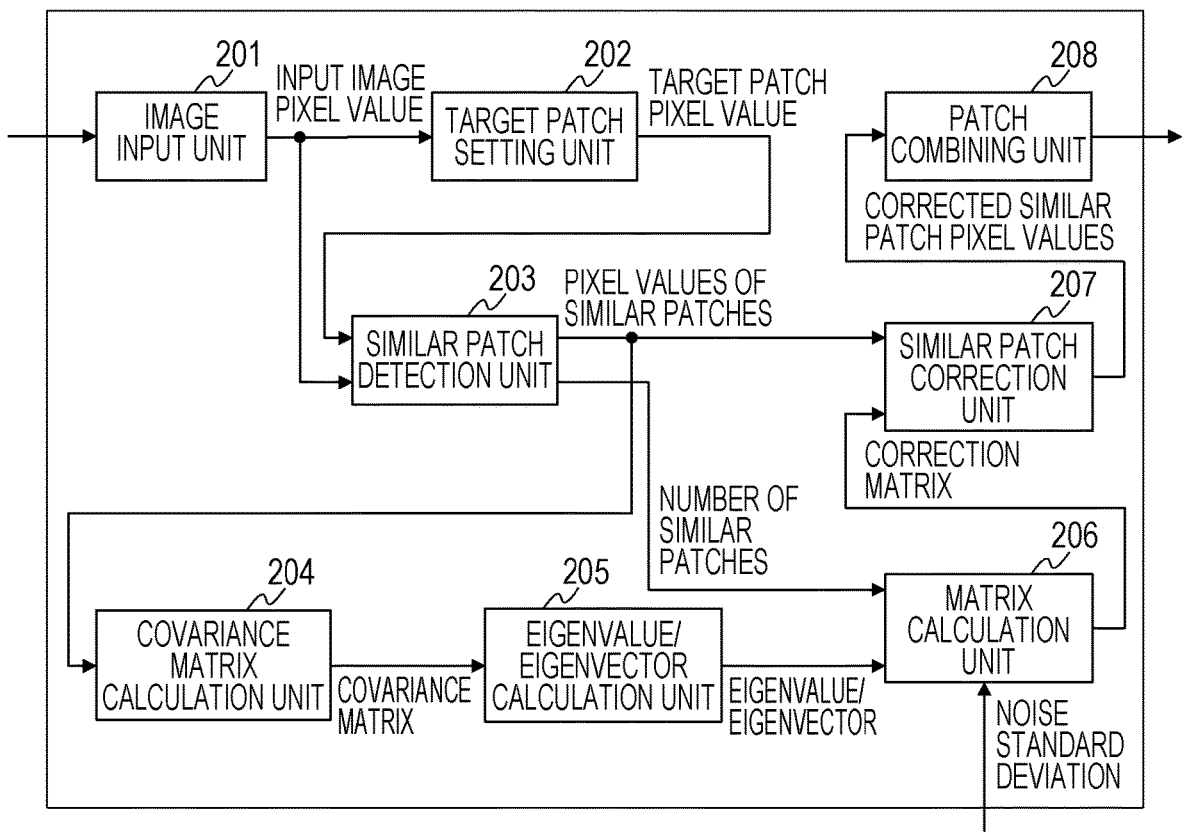
FIG. 2A is a block diagram illustrating a logical configuration of the image processing apparatus in detail.

FIG. 2A is a block diagram illustrating a logical configuration of an image processing apparatus which executes the noise reduction process according to this embodiment in detail. The image processing apparatus 100 includes an image input unit 201, a target patch setting unit 202, a similar patch detection unit 203, a covariance matrix calculation unit 204, an eigenvalue/eigenvector calculation unit 205, a matrix calculation unit 206, a similar patch correction unit 207, and a patch combining unit 208.

The image input unit 201 obtains image data indicating an input image. In this embodiment, the input image is a monochrome image including pixels having pixel values in a range from 0 to 255 (8 bits). The target patch setting unit 202 sets a target patch relative to a target pixel in the input image. Here, the target pixel is determined in raster order from an upper left pixel in the pixels included in the input image. Furthermore, a shape of the target patch is set in advance. The target patch setting unit 202 sets a region of 5 pixels by 5 pixels including the target pixel as the target patch in this embodiment.

The similar patch detection unit 203 detects similar patches by setting a plurality of reference patches in the vicinity of the target pixel and selecting a number of the reference patches which are similar to the target patch as similar patches. Note that the similar patch detection unit 203 selects a plurality of reference patches as similar patches in this embodiment. Specifically, the similar patch detection unit 203 first sets pixels in the vicinity of the target pixel included in a predetermined area as reference pixels in turn and sets reference patches relative to the reference pixels in the same manner as the target patch. Thereafter, the similar patch detection unit 203 obtains similarity degrees between each reference patch and the target path so as to determine whether the individual reference patches are similar to the target patch. In case that each of the reference patches is similar to the target patch, the reference patch is selected as a similar patch. Here, a rectangle region of 15 pixels by 15 pixels including the target pixel is determined as the predetermined area for setting the reference pixels. Therefore, the similar patch detection unit 203 sets 225 pixels including the target pixel as reference pixels and detects 225 similar patches at maximum. The similar patch detection unit 203 further counts the number of selected similar patches for the target pixel to be subjected to processing.

The covariance matrix calculation unit 204 calculates a covariance matrix based on the plurality of similar patches. The covariance matrix indicates the correlation between the pixels in the similar patches. In a case where two adjacent pixels in the patch are focused, if values of the two pixels are close to each other in a large number of the similar patches or have similar differences in a large number of the similar patches, it may be determined that the two pixels have correlation. Eigenvalues and eigenvectors described below are calculated in the covariance matrix relate to such correlation between pixels so that a texture component is extracted from a patch group.

The eigenvalue/eigenvector calculation unit 205 calculates a plurality of eigenvalues in the covariance matrix and eigenvectors corresponding to the eigenvalues. The eigenvectors indicate texture components extracted from the similar patches. Each of the similar patches may be represented by an average patch and the extracted texture components. The eigenvalues indicate variation of a frequency of appearance of texture components in the similar patches. The larger an eigenvalue corresponding to an eigenvector becomes, the larger variation of a texture component indicated by the eigenvector becomes. Conversely, if variation of a texture component is negligible, the eigenvalue corresponds to noise variance in the input image.

Figure 2B:
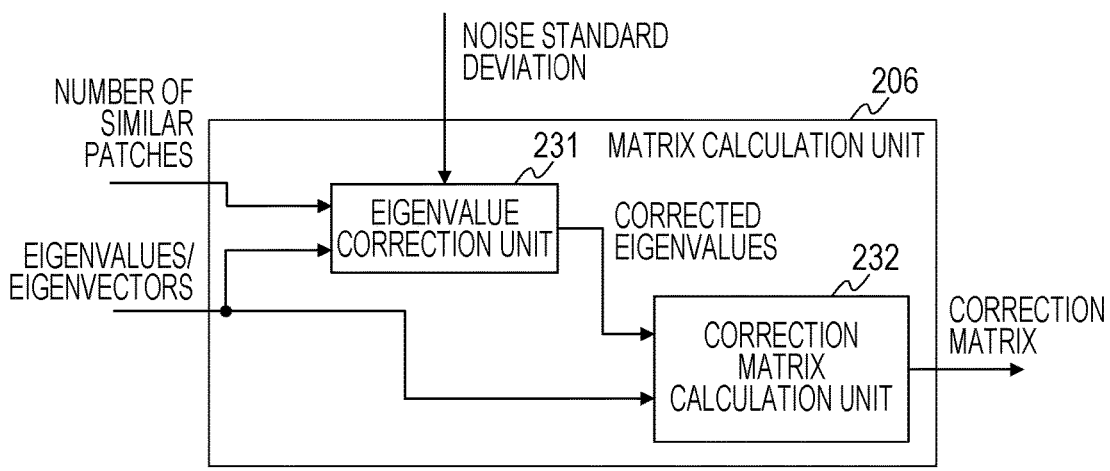
FIG. 2B is a block diagram illustrating a logical configuration of a matrix calculation unit in detail.

The matrix calculation unit 206 corrects the eigenvalues in accordance with the number of similar patches calculated by the similar patch detection unit 203 and obtains a correction matrix for reducing noise for the plurality of similar patches. FIG. 2B is a diagram illustrating the matrix calculation unit 206 in detail. An eigenvalue correction unit 231 corrects the individual eigenvalues based on the eigenvalues, the number of similar patches, and a noise amount of the input image. The correction suppresses occurrence of a phenomenon in which the eigenvalues of the eigenvectors indicating the texture components generated due to the noise are accidentally becoming large, and therefore, the texture components generated due to the noise from remaining in the image which has been subjected to the noise reduction. A correction matrix calculation unit 232 calculates a correction matrix based on all the corrected eigenvalues and all the eigenvectors. The similar patch correction unit 207 corrects the plurality of similar patches based on the correction matrix calculated by the matrix calculation unit 206 so as to reduce the noise in the individual similar patches. The patch combining unit 208 combines the corrected similar patches so as to generate an output image having reduced noise in the input image. The patch combining unit 208 arranges the corrected similar patches in original positions of the input image, calculates an average value of the values of the same pixel position in the overlapping similar patches if a plurality of the similar patches overlap with each other, and updates pixel values of the original pixels by the average values, so as to combine the corrected similar patches. This combining is also referred to as aggregation.

FIG. 3 is a flowchart of the noise reduction process executed by the image processing apparatus 100 according to this embodiment. The CPU 101 reads and executes a program for realizing the flowchart of FIG. 3. Hereinafter, a flow of the noise reduction process will be described in detail with reference to FIG. 3. Note that individual processes (steps) in the flowchart are indicated using "S".

In step S301, the image input unit 201 reads an input image. In step S302, the patch combining unit 208 initializes a numerator image and a denominator image for the aggregation to 0. The number of pixels in each of the numerator image and the denominator image is the same as that of the input image in vertical and horizontal directions.

In step S303, the target patch setting unit 202 selects a target pixel in the input image and sets a target patch corresponding to the target pixel. As described above, in this embodiment, the target pixel is set in raster order in the input image. Here, the target patch includes M pixels. It is assumed in this embodiment that the target patch includes a rectangle region of 5 pixels by 5 pixels, and therefore, M is 25. Hereinafter, the target patch is indicated by a column vector T formed by aligning values of the M pixels.

In step S304, the similar patch detection unit 203 sets a plurality of reference patches for the target patch T set in step S303. Shapes of the reference patches are the same as a shape of the target patch. Therefore, each of the reference patches also includes M pixels. Hereinafter, an i-th reference patch is indicated by a column vector $R_i$ including the aligned M pixel values. In this embodiment, i is one of 1 to 225.

In step S305, the similar patch detection unit 203 selects the reference patches which are similar to the target patch as similar patches. Specifically, the similar patch detection unit 203 first calculates similarity degrees between each reference patches set in step S304 and the target patch. The similarity degree between the target patch and one reference patch are calculated by a sum of squared differences (SSD) using the individual pixels of the target patch and the individual pixels the reference patch. The similar patch detection unit 203 calculates a sum of squared differences (SSD) of an i-th patch in accordance with Expression (1) below.

$$SSD_i \equiv \|R_i - T\|^2 = \sum_{j=1}^{M} (R_i(j) - T(j))^2 \quad (1)$$

Here, $R_i(j)$ indicates a value of a j-th pixel in the i-th reference patch. T(j) indicates a value of a j-th pixel in the target patch T. The sum of squared differences is obtained by adding values obtained by squaring differences of values of two pixels in the same pixel position in the patch. In this way, in case that the similarity degree are calculated using the sum of squared differences $SSD_i$, as a value of a similarity degree becomes smaller, the reference patch $R_i$ is more similar to the target patch T. Specifically, the smaller a value of a similarity degree is, the higher the similarity degree is. On the other hand, as a value of a similarity degree is larger, the reference patch $R_i$ is more different from the target patch T.

The similar patch detection unit 203 selects a plurality of the reference patches which have high similarity degrees as similar patches. The similar patch detection unit 203 compares a preset threshold value with each of the similarity degrees (the sums of squared differences) calculated for the reference patches. In case that a value of the similarity degree is smaller than the threshold value, a corresponding reference patch is selected as a similar patch. The similar patch detection unit 203 selects a plurality of reference patches as similar patches. A group of the similar patches is referred to as a "patch group". It is assumed hereinafter that the similar patch detection unit 203 has detected N similar patches. Furthermore, in the selected N similar patches, i-th similar patch is indicated by $P_i$. Note that a sum of absolute differences (SAD) may be used as an index of a similarity degree instead of the sum of squared differences. Furthermore, the similar patch detection unit 203 calculates the number N of the selected similar patches. The number N of similar patches is determined in accordance with determinations as to whether the individual reference patches are similar to the target patch. Therefore, the different numbers of similar patches can be obtained for different target patches in many cases.

In step S306, the covariance matrix calculation unit 204 calculates an average patch of the similar patches and a covariance matrix C based on the plurality of similar patches selected in step S305. First, the covariance matrix calculation unit 204 calculates averages of values of pixels in the same positions and the average values are stored in the corresponding pixels so as to calculate an average patch. Accordingly, the average patch has the same shape as the target patch and includes M pixels. Assuming that a column vector obtained by aligning values of the M pixels in the average patch is indicated by Q, the covariance matrix calculation unit 204 calculates the average patch in accordance with Expression (2).

$$Q \equiv \frac{1}{N} \sum_{i=1}^{N} P_i \quad (2)$$

Furthermore, the covariance matrix C calculated using the patch group is a square matrix and the size of one side is M which is the same as the number of pixels in the similar patches. The covariance matrix calculation unit 204 calculates the covariance matrix C using the average patch Q in accordance with Expression (3).

$$C \equiv \frac{1}{N-1} \sum_{i=1}^{N} (P_i - Q)(P_i - Q)^t \quad (3)$$

In step S307, the eigenvalue/eigenvector calculation unit 205 calculates eigenvalues and eigenvectors of the covariance matrix C. In general, a plurality of eigenvalues and a plurality of eigenvectors are obtained, and the number of eigenvalues and the number of eigenvectors correspond to a size of one side of the covariance matrix. Specifically, M eigenvalues and M eigenvectors corresponding to the M pixels included in the similar patches are obtained. Furthermore, the number of elements in each of the eigenvectors is the same as the M pixels of the similar patches. An i-th eigenvalue is indicated by "$\lambda_j$" and a j-th eigenvector is indicated by "$E_j$". The eigenvalue X and the eigenvector $E_j$ of the covariance matrix C satisfy the relationship represented by Expression (4) relative to the covariance matrix C.

Specifically, the eigenvalue $\lambda_j$ and the eigenvector $E_j$ correspond to each other.

$$CE_j = \lambda_j E_j \quad (4)$$

The eigenvalue/eigenvector calculation unit 205 calculates the eigenvalue $\lambda_j$ and the eigenvector $E_j$ which satisfy Expression (4). The eigenvector $E_j$ corresponds to a texture component extracted from the group of patches which are similar to each other. Furthermore, the eigenvalue $\lambda_j$ corresponds to variation of an appearance frequency in each of the similar patches of the eigenvectors. In a case where a texture component indicated by an eigenvector indicates texture due to noise, an eigenvalue is approximately within variance of noise in the input image. As the eigenvalue becomes larger than the noise variance, the eigenvector corresponding to the eigenvalue is more likely to be a texture component of a subject to remain in the input image. In step S310 below, the noise reduction process is performed on the individual similar patches so that texture components of the subject remain and texture components caused by noise are removed.

In step S308, the eigenvalue correction unit 231 corrects the individual eigenvalues calculated in step S307. The eigenvalue correction unit 231 corrects the individual eigenvalues based on the individual eigenvalues calculated in step S307, the noise amount in the input image, and the number of similar patches selected in step S305. In the noise reduction process to be performed on a patch in step S310 described below, a determination as to whether a texture component of an eigenvector is to be remained is made in accordance with a corresponding eigenvalue. Eigenvectors close to the noise variance are seen to be noise and are removed from similar patches. On the other hand, eigenvectors corresponding to eigenvalues which are separate from the noise variance are seen to be texture to be remained, and therefore, are remained in similar patches. However, the eigenvalues of the texture component generated due to the noise actually has variation near the noise variance. As a result of the variation of the eigenvalues, a texture component generated by noise to be removed may be seen to be texture to be remained. Accordingly, in this embodiment, to suppress the phenomenon in which a texture component generated by noise is remained in an image, eigenvalues which are smaller than a value calculated in a case of a texture component to be remained are corrected to values approximately corresponding to the noise variance.

Figure 4:
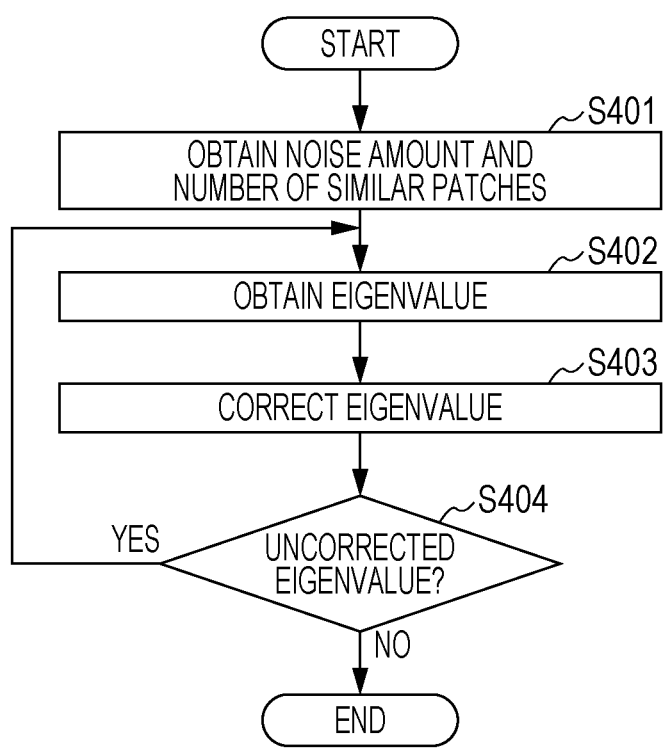
FIG. 4 is a flowchart of a flow of an eigenvalue correction process.

FIG. 4 is a diagram illustrating the process of correcting eigenvalues in detail. FIG. 4 is a flowchart of the process of correcting eigenvalues performed in step S308 illustrated in detail. In the process described below, when the noise reduction process is performed on the individual similar patches, the eigenvalue correction unit 231 first obtains a noise amount $\sigma$ in the input image and the number N of similar patches selected in step S305 in step S401. Here, the noise amount $\sigma$ is standard deviation of noise in the input image. In general, an image obtained by capturing using a capturing apparatus has standard deviation of noise which is varied in accordance with characteristics of the capturing apparatus. The standard deviation of noise in the input image is stored by measuring the noise amount $\sigma$ of the input image for each type of the capturing apparatus which has captured the input image or each sensitivity degree set in the capturing in advance. Here, the eigenvalue correction unit 231 stores the noise amounts $\sigma$ for individual types of capturing apparatus and individual ISO sensitivities in a table. The eigenvalue correction unit 231 sets the noise amount of the input image based on the type of the capturing apparatus which has obtained the input image to be processed and the ISO sensitivity set in the capturing. Note that the method for storing the noise amounts in accordance with types of capturing apparatus and settings in capturing as a table may not be limited. For example, the eigenvalue correction unit 231 may use a general method for calculating noise standard deviation using a flat area in the input image.

Figure 5A:
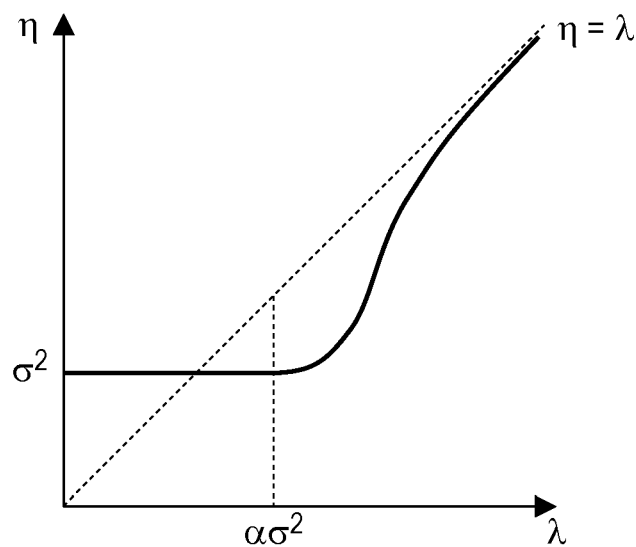
FIGS. 5A and 5B are diagrams illustrating the relationship between an eigenvalue and a correction value.

In step S402, the eigenvalue correction unit 231 obtains one of the eigenvalues calculated in step S307. In step S403, the eigenvalue correction unit 231 corrects the target eigenvalue $\lambda$ obtained in step S402 using a correction function. Hereinafter, an eigenvalue n obtained after the correction is referred to as a correction value $\eta$. FIG. 5A is a diagram illustrating characteristics of the correction function which is referred to by the eigenvalue correction unit 231. The eigenvalue $\lambda$ is corrected in accordance with noise variance determined in accordance with the noise amount in the input image. In the correction function illustrated in FIG. 5A, in case where the eigenvalue $\lambda$ is smaller than a times the noise variance (a square of the noise amount a which is the noise standard deviation), the correction value $\eta$ substantially corresponds to a noise variance $\sigma^2$. In a case where the eigenvalue 2 is larger than a times the noise variance, the correction value $\eta$ is set to be larger than the noise variance $\sigma^2$. Furthermore, in case where the eigenvalue $\lambda$ is sufficiently large, the correction value $\eta$ is substantially the same as the original eigenvalue. The eigenvalue correction unit 231 corrects the eigenvalue so as to substantially correspond to the noise variance using the correction function in case where the eigenvalue $\lambda$ is smaller than $\alpha$ times the noise variance.

Figure 5B:
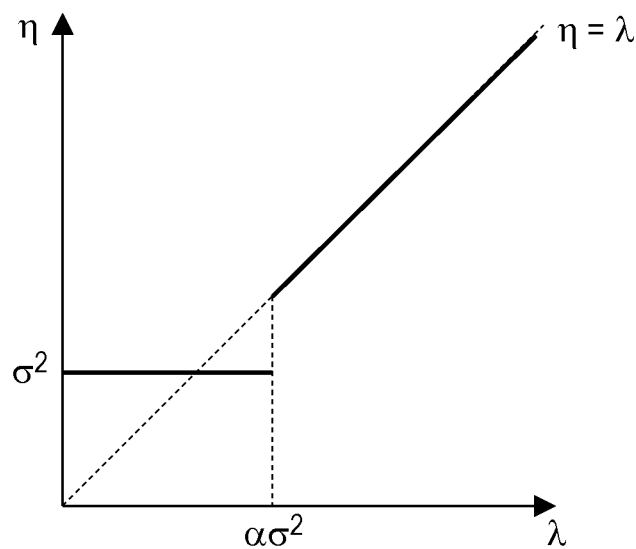

Furthermore, the eigenvalue correction unit 231 sets a coefficient $\alpha$ in accordance with the number of similar patches selected corresponding to the target pixel. It is preferable that the coefficient $\alpha$ is equal to or larger than 1. In case that the number of similar patches is small, eigenvalues corresponding to texture components generated by noise have large variation. Specifically, it is highly likely that the eigenvalues calculated in case that the number of similar patches is small are texture components generated due to noise even if the eigenvalues are larger than the noise variance. As the number of similar patches is larger, a phenomenon in which a large eigenvalue is calculated for a texture component generated due to noise is hardly generated. Therefore, as the number of similar patches is larger, an upper limit of the eigenvalues to be corrected may be small. Accordingly, the eigenvalue correction unit 231 of this embodiment sets a smaller coefficient $\alpha$ as the number N of similar patches becomes larger. For example, in the 225 reference patches of this embodiment, in case that the number N of similar patches is 49 or less, the coefficient $\alpha$ is 4.0, the number N is in a range from 50 to 100, the coefficient $\alpha$ is 3.0, the number N is in a range from 101 to 200, the coefficient $\alpha$ is 2.0, and the number N is 201 or more, the coefficient $\alpha$ is 1.0. By setting the coefficient $\alpha$ as described above, noise of the similar patches may be appropriately reduced in accordance with the number N of similar patches. Note that a smooth curve is preferably rendered in an interval in which the eigenvalue is larger than a times the noise variance and the corrected eigenvalue $\eta$ becomes substantially the same as the eigenvalue $\lambda$ (the eigenvalue is not corrected). However, as illustrated in FIG. 5B, a range in which the eigenvalue $\lambda$ is to be corrected may be discontinuously changed.

In step S404, the eigenvalue correction unit 231 determines whether an uncorrected eigenvalue exists. When the determination is affirmative, the process returns to step S402. When the correction process has performed on all the eigenvalues, the flow is terminated. The process of correcting eigenvalues performed in step S308 has been described in detail hereinabove.

Referring back to FIG. 3, in step S309, the correction matrix calculation unit 232 calculates a correction matrix based on the eigenvalues corrected in step S308 and the eigenvectors calculated in step S307. Specifically, the correction matrix calculation unit 232 calculates a correction value calculation matrix H represented by Expression (5) below as the correction matrix using eigenvectors $E_i$ (i=1 to M) corresponding to the corrected eigenvalues $\eta_i$ (i=1 to M).

$$H \equiv \sigma^2 (E_1 E_2 \ldots E_M)^t \, \text{diag}(\eta_1^{-1}, \eta_2^{-1}, \ldots, \eta_M^{-1}) (E_1 E_2 \ldots E_M) \quad (5)$$

Here, as with the covariance matrix C, the correction value calculation matrix H calculated here is a square matrix having M on one side which is the same as the number of pixels in one similar patch. The correction value calculation matrix H is obtained by replacing the eigenvalues $\lambda$ in the covariance matrix C with the eigenvalues $\eta$ and calculating an inverse matrix, and multiplying the inverse matrix by noise variance.

In step S310, the similar patch correction unit 207 corrects the individual similar patches based on the correction value calculation matrix H. Specifically, assuming that an average patch is denoted by Q and an i-th similar patch is denoted by $P_i$, the similar patch correction unit 207 calculates a corrected similar patch $O_i$ in accordance with Expression (6) below.

$$O_i \equiv P_i - H(P_i - Q) \quad (6)$$

Specifically, a second term "$H(P_i - Q)$" in Expression (6) is a correction value for the similar patch $P_i$. When the correction value is subtracted from the similar patch $P_i$, noise in the similar patch is reduced.

In step S311, the patch combining unit 208 calculates a numerator image and a denominator image based on the similar patches $O_i$ calculated in step S310. Specifically, the patch combining unit 208 adds values of pixels included in a corrected similar patch to positions of pixels in a numerator image. The positions where the pixel values are added correspond to positions of the similar patch in the input image. Furthermore, 1 is added to the same positions in the denominator image.

In step S312, it is determined whether an unprocessed target patch exists. When the determination is affirmative, the process returns to step S303. When the determination is negative, the process proceeds to step S313. In step S313, the patch combining unit 208 divides values of pixels in the numerator image by values of pixels in the denominator image. When the process from step S303 to step S311 is executed on a target pixel, the same pixel may be included in a plurality of similar patches. Furthermore, in case that each of the individual pixels included in the input image is set as the target pixel in turn and the process from step S303 to step S311 is repeatedly performed, the same pixel may be subjected to the noise reduction performed on the patches a plurality of times as a result. Accordingly, as a result of the noise reduction process performed on the individual patches in the patch group based on the group of the patches which are similar to the target patch, average values of pixels having a plurality of pixel values is calculated as pixel values in an output image. The patch combining unit 208 generates an image obtained by dividing the numerator image by the denominator image as the output image and terminates the process. The processing flow of the program of the noise reduction process according to this embodiment has been described hereinabove.

As described above, according to this embodiment, the eigenvalues and the eigenvectors are calculated for the covariance matrix C calculated using the N similar patches. Next, the eigenvalues are corrected based on the noise amount and the number N of similar patches, and the correction value calculation matrix H is calculated using the corrected eigenvalues and the eigenvectors. Thereafter, noise in the individual patches is reduced using the correction value calculation matrix H. In the general NL Bayes approach, noise of individual patches is reduced using an inverse matrix $C^{-1}$ of a covariance matrix instead of the correction value calculation matrix H according to this embodiment. However, if the method for reducing noise in the individual patches using the inverse matrix $C^{-1}$ of the covariance matrix is employed, texture accidentally generated by noise may tend to remain in the individual patches. Consequently, noise having a patterned shape is visually recognized in an output image. In this embodiment, eigenvalues are calculated and the eigenvalues are appropriately corrected based on the number N of similar patches so that texture accidentally generated due to noise may be processed as noise and generation of noise of a patterned shape may be suppressed.

Note that, although a monochrome image of 8 bits is illustrated as an input image in this embodiment, the present disclosure is applicable to an image of a large number of bits or a color image having a plurality of color components. Alternatively, an image of Bayer array of 14 bits may be used as an input image.

Furthermore, a shape of the target patch is not limited to a rectangle region of 5 pixels by 5 pixels. In a case of a color image, processing may be performed for each color, or this embodiment is directly applied when a shape of the target patch is 5 pixels×5 pixels×the number of colors. Although the target patch including the target pixel at a center is set for the target pixel in this embodiment, the present disclosure is not limited to this. The target patch may be set such that the target pixel is located in an edge position, or a pixel group other than the target pixel may be set as the target patch.

First Modification

In the first embodiment, an example of a method for outputting the corrected eigenvalues $\eta$ relative to all the eigenvalues $\lambda$ using the function having the characteristics illustrated in FIG. 5A as the eigenvalues of the covariance matrix C is illustrated. However, in a range in which the eigenvalues $\lambda$ are sufficiently large, the eigenvalues are output as the corrected eigenvalues $\eta$. This means that the eigenvalues $\lambda$ are not required to be corrected in the range in which the eigenvalues $\lambda$ are sufficiently large. Here, a determination as to whether the correction is to be performed may be made based on the number of similar patches and noise variance in advance. Specifically, first, the eigenvalue correction unit 231 obtains a threshold value $\alpha\sigma^2$ in accordance with the number of similar patches and the noise variance. Then the eigenvalues and the threshold value $\alpha\sigma^2$ are compared with each other. When the eigenvalue $\lambda$ is smaller than the threshold value $\alpha\sigma^2$, the eigenvalue $\lambda$ is corrected to the noise variance $\sigma^2$. When the eigenvalue $\lambda$ is equal to or larger than the threshold value $\alpha\sigma^2$, the eigenvalue $\lambda$ is not corrected. As described above, the effect of the first embodiment may be obtained even in the mode in which the eigenvalues are corrected in accordance with a result of the determination as to whether the eigenvalues are to be corrected made in advance.

In the first embodiment, the eigenvalues of the covariance matrix C are corrected based on the noise amount, the number of similar patches, and the eigenvalues, the correction value calculation matrix H is obtained using the corrected eigenvalues, and noise in the similar patches are reduced, for example. In a second embodiment, a process to be performed in a case where the number N of pixels of a target patch is changed for each target patch in accordance with characteristics in the vicinity of a target pixel will be described. A hardware configuration of this embodiment is the same as that of the first embodiment, and therefore, a description thereof is omitted. Furthermore, components the same as those of the first embodiment are denoted by reference numerals the same as those of the first embodiment and detailed descriptions thereof are omitted.

Figure 6A:
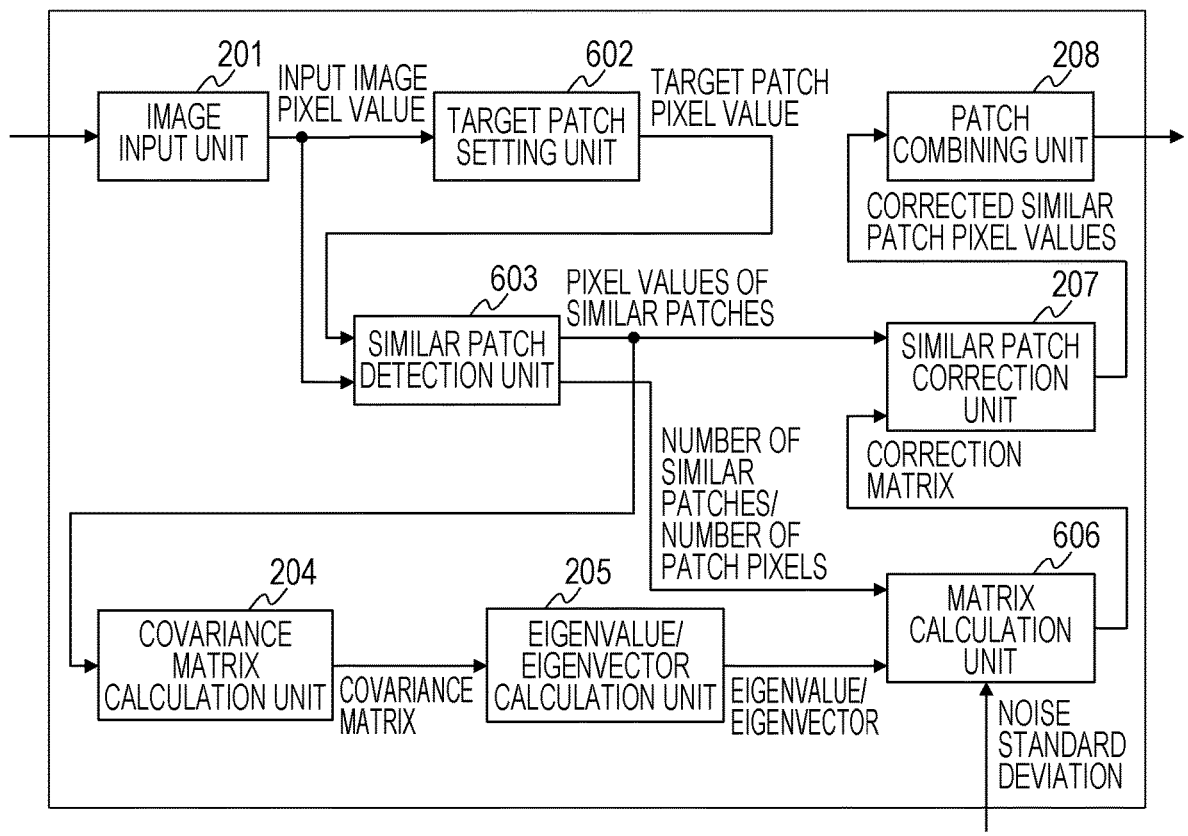
FIG. 6A is a block diagram illustrating a logical configuration of an image processing apparatus in detail.
Figure 6B:
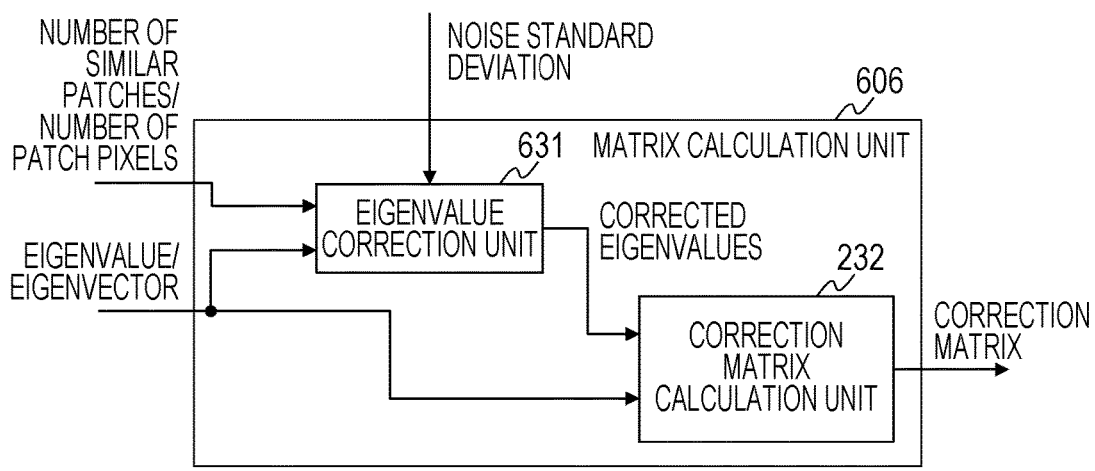
FIG. 6B is a block diagram illustrating a logical configuration of a matrix calculation unit in detail.

FIGS. 6A and 6B are block diagrams illustrating detailed logical configurations of an image processing apparatus which executes a noise reduction process according to the second embodiment. In FIG. 6A, a target patch setting unit 602 determines whether an edge is located in the vicinity of the target pixel and sets a shape of the target patches in accordance with a result of the edge determination. Specifically, in the second embodiment, an edge is used as a characteristic in the vicinity of the target pixel. A similar patch detection unit 603 detects similar patches in the same manner as the first embodiment and counts the number of similar patches. In the second embodiment, the similar patch detection unit 603 also counts the number of pixels in the patches. FIG. 6B is a block diagram illustrating a detailed logical configuration of a matrix calculation unit 606. An eigenvalue correction unit 631 corrects eigenvalues based on a noise amount, the number of similar patches, and the number of pixels in the patches.

Figure 7:
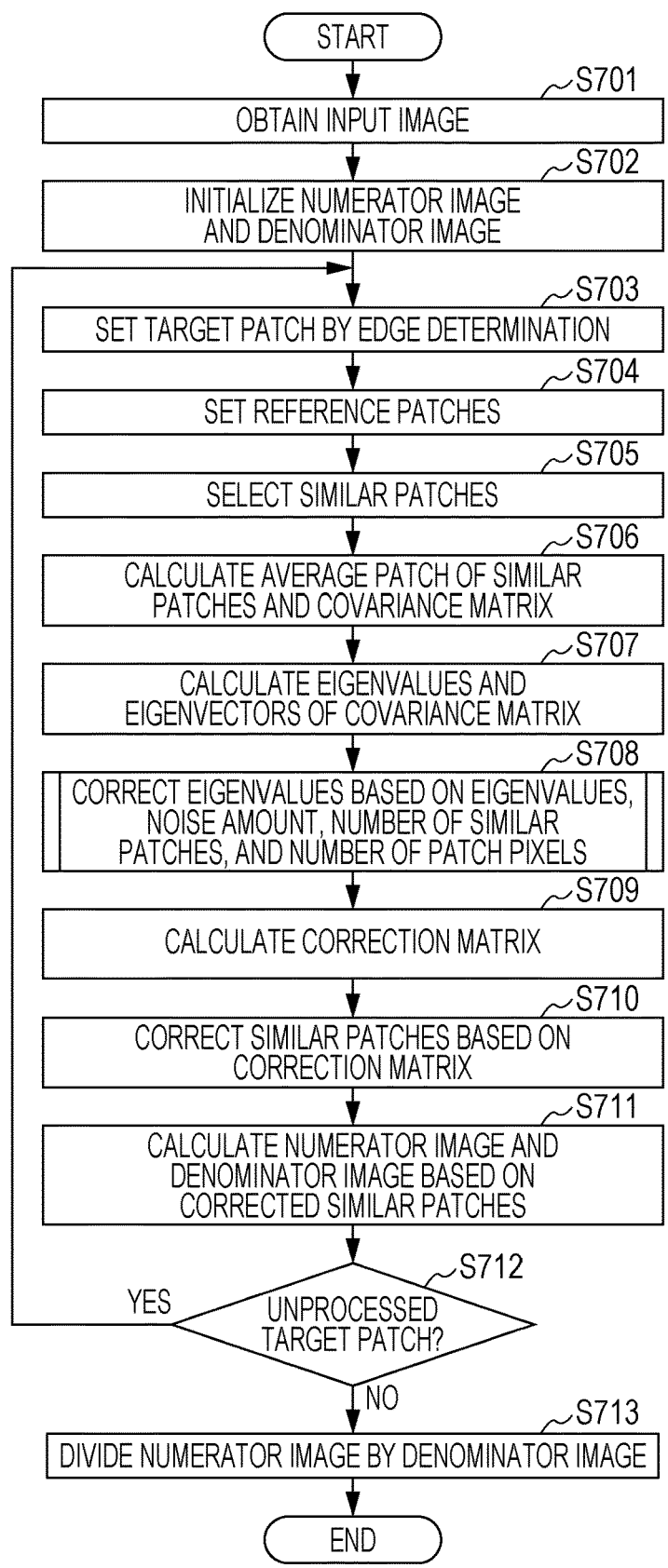
FIG. 7 is a flowchart of a noise reduction process.

FIG. 7 is a flowchart of a program of the noise reduction process according to this embodiment. Hereinafter, a flow of a pixel process will be described with reference to FIG. 7. In step S701, an image input unit 201 reads an input image. In step S702, a patch combining unit 208 initializes a numerator image and a denominator image to 0 so as to perform aggregation.

In step S703, the target patch setting unit 602 sets a target patch in the input image. First, it is determined whether an edge is detected in the vicinity of the target pixel based on the target pixel and pixels in the vicinity of the target pixel. Specifically, an edge detection filter, such as a Sobel filter, is employed for the input image. The edge detection filter is used so as to calculate edge degrees of individual pixels. If the target pixel and neighboring pixels have a large edge degree, it is determined that an edge exists in the vicinity of the target pixel and a target patch T having a small number of pixels is set. On the other hand, if the target pixel or a neighboring pixel does not have a large edge degree, a target patch T having a large number of pixels is set. Here, when an edge exists in the vicinity of the target pixel, a region of 5 pixels by 5 pixels including the target pixel at a center is determined as the target patch, and otherwise, a region of 7 pixels by 7 pixels including the target pixel at a center is determined as the target patch. In a description below, it is assumed that the target patch T includes M pixels. In the second embodiment, the number M of pixels is set in accordance with the target pixel.

In step S704, the similar patch detection unit 603 sets a plurality of reference patches relative to the target patch T set n step S703. Shapes of the reference patches are the same as a shape of the target patch T. Therefore, each of the reference patches also includes M pixels.

In step S705, as with the process in step S305 of the first embodiment, the similar patch detection unit 603 calculates similarity degrees of the individual reference patches set in step S704 relative to the target patch and selects a number of the reference patches having high similarity degrees as similar patches.

In step S706, the covariance matrix calculation unit 204 calculates an average patch of the similar patches selected in step S705 and a covariance matrix C. The average patch is calculated by averaging values of pixels in the same position in the similar patches. Specifically, the average patch includes M pixels. The covariance matrix C is a square matrix and has a size of M on one side.

Figure 8:
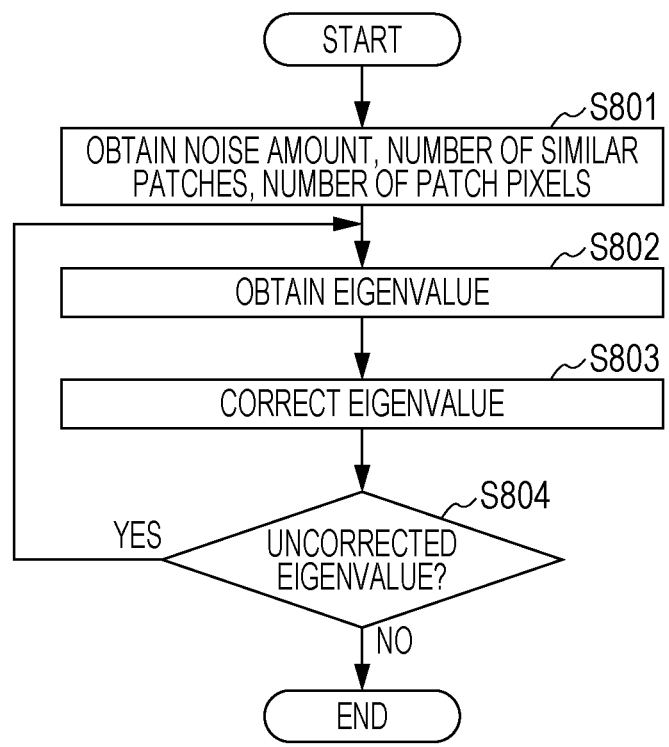
FIG. 8 is a flowchart of an eigenvalue correction process.

In step S707, the eigenvalue/eigenvector calculation unit 205 calculates eigenvalues and eigenvectors of the covariance matrix C calculated in step S706. In step S708, the eigenvalue correction unit 631 corrects the individual eigenvalues calculated in step S707. The correction process in step S708 is performed based on the eigenvalues calculated in step S707, a noise amount of the input image, the number of similar patches selected in step S705, and the number M of pixels in each of the patches. The number M of pixels of the patches is set in accordance with a result of a determination as to whether an edge exists, and therefore, the number of pixels in the patches varies depending on the target pixel. FIG. 8 is a diagram illustrating a process of correcting eigenvalues in detail.

First, in step S801, the eigenvalue correction unit 631 obtains a standard deviation σ of noise included in the input image, the number N of similar patches selected in step S705, and the number M of pixels included in the target patch set in step S703.

In step S802, the eigenvalue correction unit 631 obtains one of the eigenvalues calculated in step S707.

In step S803, the eigenvalue correction unit 631 corrects the eigenvalue λ obtained in step S802 using the function having the characteristic illustrated in FIG. 5A so as to obtain corrected eigenvalue η. Specifically, in case where the eigenvalue λ is smaller than a times the noise variance (a square of a noise standard deviation σ), correction is performed such that the corrected value η substantially corresponds to noise variance $σ^2$. In case where the eigenvalue λ is larger than α times the noise variance, the corrected value η is also larger than the noise variance $σ^2$ and the correction value η obtained in case where the eigenvalue is sufficiently large substantially corresponds to the original eigenvalue. Furthermore, the eigenvalue correction unit 631 sets a coefficient α in accordance with the number N of similar patches and the number M of pixels of a patch. It is preferable that the coefficient α is equal to or larger than 1. As with the first embodiment, as the number of similar patches is larger, a large eigenvalue is hardly generated for a texture component generated due to noise. Therefore, as the number of similar patches is larger, an upper limit of the eigenvalues to be corrected may be small. Specifically, the larger the number N of similar patches becomes, the smaller the coefficient α becomes. Conversely, as the number M of pixels in the patches is larger, a larger eigenvalue for a texture component generated due to noise is likely to be generated, and therefore, as the number M of pixels in the patches is larger, the upper limit of the eigenvalues to be corrected is increased. Specifically, the larger the number M of pixels in the patch becomes, the larger the coefficient α becomes. For example, in a case where the number M of pixels in the patch is 25, in case where the number N of similar patches is 49 or less, the coefficient α is 4.0, in case where the number N is in a range from 50 to 100, the coefficient α is 3.0, in case where the number N is in a range from 101 to 200, the coefficient α is 2.0, and the number N is 201 or more, the coefficient α is 1.0. Furthermore, in a case where the number M of patch pixels is 49, when the number N of similar patches is 49 or less, the coefficient α is 5.0, in a case where the number N is in a range from 50 to 100, the coefficient α is 4.0, in a case where the number N is in a range from 101 to 200, the coefficient α is 3.0, and in a case where the number N is 201 or more, the coefficient α is 2.0. In this way, by setting the coefficient α in accordance with the number of pixels and the number of similar patches, noise in the similar patches may be appropriately reduced. A smooth curve is preferably rendered as illustrated in FIG. 5A in an interval until the eigenvalue is larger than a times the noise variance and the corrected eigenvalue η becomes substantially the same as the eigenvalue. However, the effect of reduction of patterned noise may be attained even in a case of discontinuous switching as illustrated in FIG. 5B.

In step S804, the eigenvalue correction unit 631 determines whether an uncorrected eigenvalue exists. When the determination is affirmative, the process returns to step S802. When the correction is performed on all the eigenvalues, this flow is terminated. The process of correcting eigenvalues performed in step S708 has been illustrated in detail hereinabove.

Referring back to FIG. 7, a description below will be made. In step S709, as with the process in step S309 of the first embodiment, a correction matrix calculation unit 232 calculates a correction value calculation matrix H based on the eigenvalues corrected in step S708 and the eigenvectors calculated in step S707.

In step S710, the similar patch correction unit 207 corrects the individual similar patches based on the correction value calculation matrix H. A concrete method thereof is the same as that employed in step S310 of the first embodiment. In step S711, the patch combining unit 208 calculates a numerator image and a denominator image based on the similar patches corrected in step S710. A concrete method thereof is the same as that employed in step S311 of the first embodiment. In step S712, it is determined whether an unprocessed target patch exists. When the determination is affirmative, the process returns to step S703. When the determination is negative, the numerator image is divided by the denominator image and a resultant image is output before the process is terminated. The flow of the noise reduction process according to this embodiment has been described hereinabove.

As described above, in this embodiment, after the eigenvalues and the eigenvectors are calculated relative to the covariance matrix C calculated using the N similar patches, the eigenvalues are corrected based on the noise amount, the number N of similar patches, and the number M of pixels in the patches. The correction value calculation matrix H is obtained using the corrected eigenvalues and the eigenvectors. Noise in the individual patches is reduced using the correction value calculation matrix H. To reduce texture accidentally generated due to noise, the coefficient α is appropriately set so as to correct the eigenvalues. In this embodiment, the coefficient α is set larger as the number M of pixels of the patches is larger and is set smaller as the number N of similar patches is larger. By this, texture accidentally generated due to noise in the similar patches may be deleted and generation of patterned noise may be effectively suppressed.

Note that, although the coefficient α and the number of pixels of the patches in this embodiment are merely examples of preferred or predetermined values, other values may be used depending on a purpose. For example, if the coefficient α is entirely set larger by 10%, the effect of reduction of patterned noise is further enhanced. On the other hand, if the noise reduction effect is enhanced, an image after the noise reduction may blur more or less. The most appropriate coefficient α is set in advance taking this trade-off into consideration.

Figure 9A:
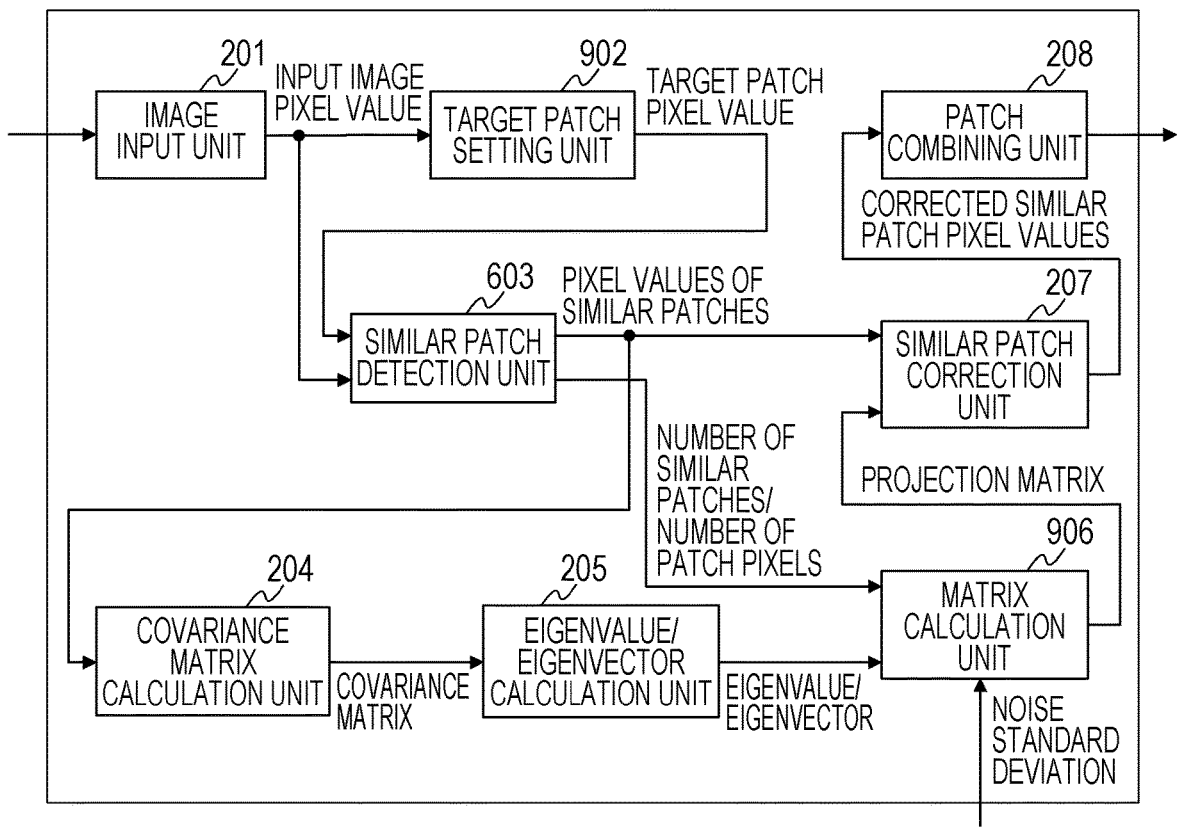
FIG. 9A is a block diagram illustrating a logical configuration of an image processing apparatus in detail.

In a third embodiment, a method for reducing noise by performing principle component analysis after a covariance matrix is obtained will be described. Components the same as those of the foregoing embodiments are denoted by reference numerals the same as those of the foregoing embodiments and detailed descriptions thereof are omitted, FIG. 9A is a block diagram illustrating a logical configuration of an image processing apparatus which executes a noise reduction process according to the third embodiment in detail. In FIG. 9A, a target patch setting unit 902 calculates variance of pixel values of a pixel group in the vicinity of a target pixel and appropriately sets a shape of the target patch based on the variance. Specifically, in the third embodiment, the variance is used as a characteristic in the vicinity of the target pixel.

Figure 9B:
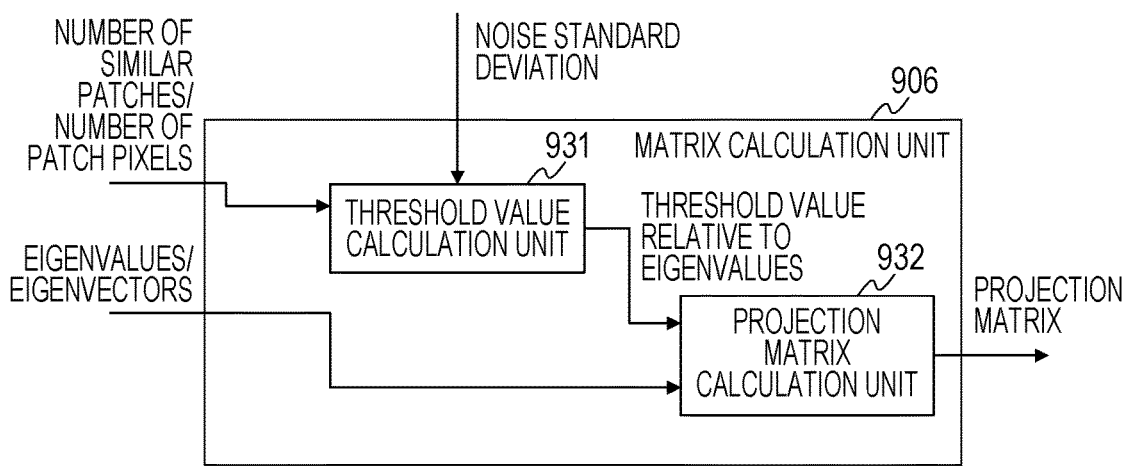
FIG. 9B is a block diagram illustrating a logical configuration of a matrix calculation unit in detail.

A matrix calculation unit 906 calculates a projection matrix used for reducing noise in similar patches based on the number of similar patches, the number of pixels in the patches, eigenvalues, eigenvectors, and a noise amount. FIG. 9B is a block diagram illustrating a detailed logical configuration of a matrix calculation unit 906. A threshold value calculation unit 931 calculates a threshold value relative to the eigenvalues based on the number of similar patches, the number of pixels in the patches, and the noise amount. A projection matrix calculation unit 932 calculates a projection matrix based on a threshold value for the eigenvalues, the eigenvalues, and the eigenvectors.

Figure 10:
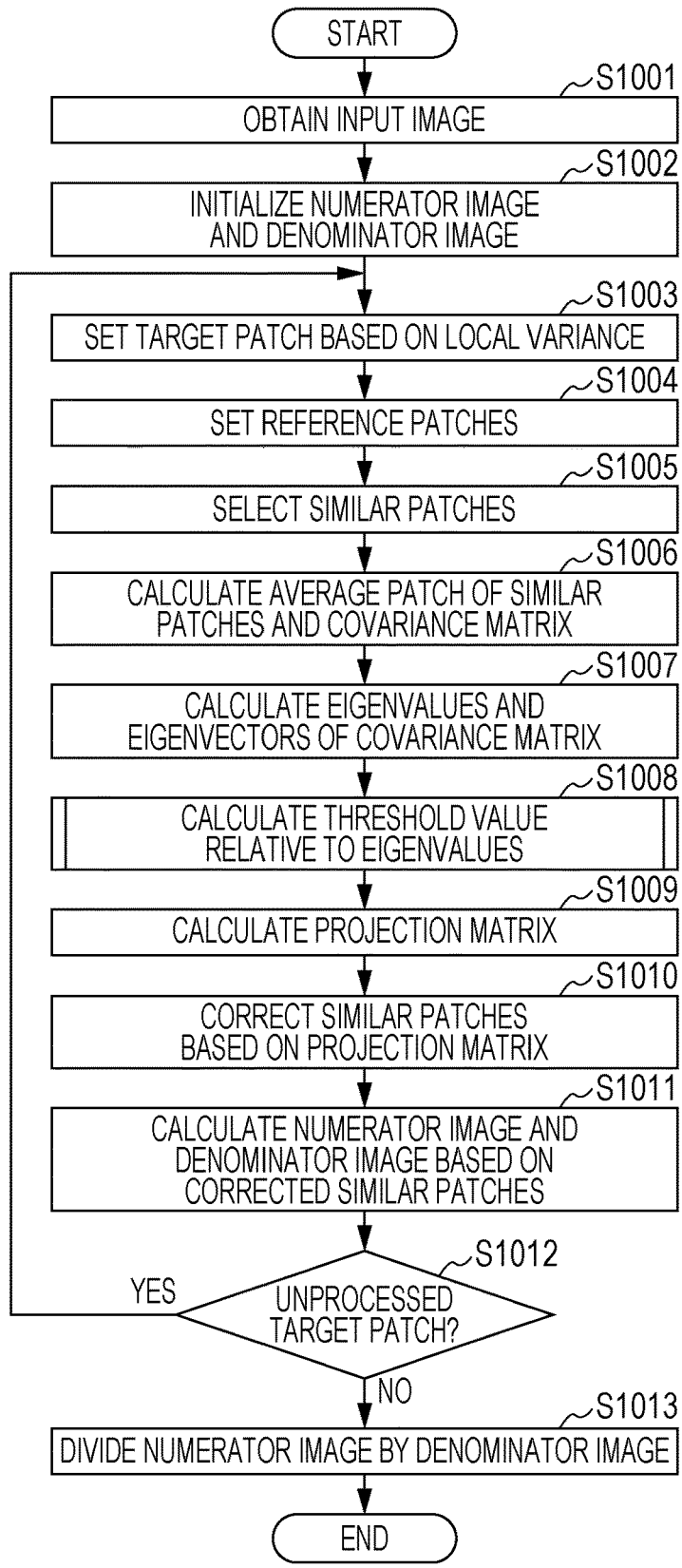
FIG. 10 is a flowchart of a flow of an eigenvalue correction process.

FIG. 10 is a flowchart of a noise reduction process according to this embodiment. Hereinafter, a processing flow of a program will be described with reference to FIG. 10. Note that the third embodiment is similar to the second embodiment, and therefore, portions different from the second embodiment will be described in detail.

In step S1001, an image input unit 201 reads an input image. In step S1002, a patch combining unit 208 initializes a numerator image and a denominator image to 0 so as to perform aggregation.

In step S1003, the target patch setting unit 902 sets a target patch in the input image. First, variance of a target pixel and pixel values of a pixel group in the vicinity of the target pixel is calculated. When the variance is large, a target patch T including a small number of pixels is set. On the other hand, when the variance is small, a target patch T including a large number of pixels is set. In a description below, it is assumed that the target patch T includes M pixels. The number M of pixels is set in accordance with the target pixel.

In step S1004, a similar patch detection unit 603 sets a plurality of reference patches for the target patch T set in step S1003. Shapes of the reference patches are the same as a shape of the target patch. Therefore, each of the reference patches also includes M pixels.

In step S1005, as with the process of step S305 of the first embodiment, the similar patch detection unit 603 calculates similarity degrees of the individual reference patches set in step S1004 relative to the target patch and selects a number of the reference patches having high similarity degrees as similar patches.

In step S1006, a covariance matrix calculation unit 204 calculates an average patch of the similar patches selected in step S1005 and a covariance matrix C. The average patch includes M pixels. The covariance matrix C is a square matrix having a size of M on one side.

In step S1007, an eigenvalue/eigenvector calculation unit 205 calculates eigenvalues and eigenvectors of the covariance matrix C calculated in step S1006.

In step S1008, the threshold value calculation unit 931 calculates a threshold value for the eigenvalues. The threshold value is calculated based on the eigenvalues calculated in step S1007, the noise amount of the input image, the number N of similar patches selected in step S1005, and the number M of pixels in each of the patches.

Figure 11:
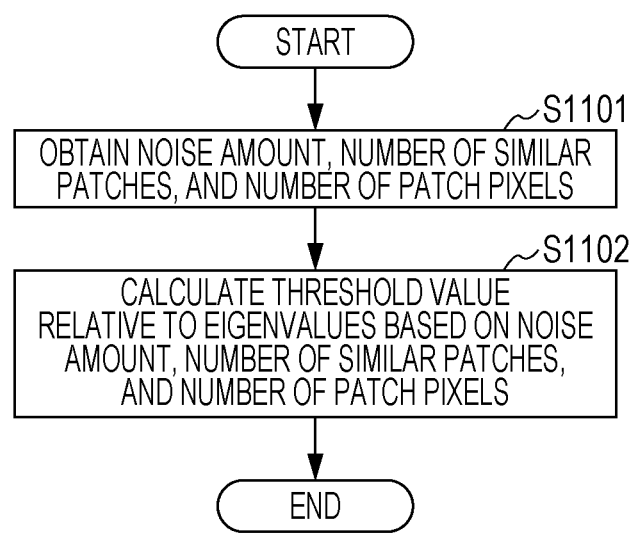
FIG. 11 is a flowchart of a threshold value calculation process.

A threshold value calculation process will be described in detail with reference to FIG. 11. First, in step S1101, the threshold value calculation unit 931 obtains a standard deviation σ of noise included in the input image, the number N of similar patches selected in step S1005, and the number M of pixels included in the target patch set in step S1003.

In step S1102, the threshold value calculation unit 931 calculates a threshold value Θ for the eigenvalues. The projection matrix calculation unit 932 compares the eigenvalues with the threshold value Θ and determines eigenvectors corresponding to eigenvalues equal to or larger than the threshold value Θ as principle components. On the other hand, eigenvectors corresponding to eigenvalues smaller than the threshold value Θ correspond to noise. In general, the eigenvalues of the eigenvectors corresponding to noise vary to some extent including noise variance at a center. Accordingly, the threshold value Θ is to be larger than a noise variance σ². Therefore, in this embodiment, the threshold value calculation unit 931 calculates the threshold value Θ in accordance with Expression (7) below while the coefficient rx is set as a real number equal to or larger than 1.

$$\theta = \alpha \sigma^2 \qquad (7)$$

In this embodiment, the coefficient α is set such that the large eigenvalues accidentally calculated due to noise are appropriately seen to be noise. As the number of similar patches is larger, a larger eigenvalue is hardly generated, and therefore, as the number of similar patches is larger, the threshold value Θ relative to the eigenvalues is smaller. Specifically, the larger the number N of similar patches becomes, the smaller the coefficient α becomes. Conversely, as the number M of pixels in the patches is larger, a larger eigenvalue is likely to be generated due to noise, and therefore, as the number M of pixels in the patches is larger, the threshold value relative to the eigenvalues is increased. Specifically, the larger the number M of pixels in the patches becomes, the larger the coefficient α becomes. For example, in a case where the number M of patch pixels is 25, when the number N of similar patches is 49 or less, the coefficient α is 4.0, when the number N is in a range from 50 to 100, the coefficient α is 3.0, when the number N is in a range from 101 to 200, the coefficient α is 2.0, and when the number N is 201 or more, the coefficient α is 1.0. Furthermore, in a case where the number M of patch pixels is 49, when the number N of similar patches is 49 or less, the coefficient α is 5.0, when the number N is in a range from 50 to 100, the coefficient α is 4.0, when the number N is in a range from 101 to 200, the coefficient α is 3.0, and when the number N is 201 or more, the coefficient α is 2.0. The threshold value calculation process performed in step S1008 has been illustrated in detail hereinabove.

Referring back to FIG. 10, a description below will be made. In step S1009, the projection matrix calculation unit 932 obtains a correction matrix based on the eigenvalues and the eigenvectors calculated in step S1007 and the threshold value Θ calculated in step S1008. In this embodiment, the projection matrix calculation unit 932 calculates a projection matrix W represented by Expressions (8) and (9) below as the correction matrix.

$$B \equiv (F_1 F_2 \ldots F_K) \qquad (8)$$

$$W \equiv BB^t \qquad (9)$$

Here, $F_1$ and $F_2$ denote eigenvectors corresponding to eigenvalues which are equal to or larger than the threshold value Θ. A matrix B is a basic matrix in which all eigenvectors which satisfy a condition in which an eigenvalue is equal to or larger than the threshold value Θ are arranged. Here, a description will be made provided that K (K≤M) eigenvalues are equal to or larger than the threshold value Θ. The basic matrix B has K rows and M columns, and the projection matrix W is a square matrix of M rows by M columns. The projection matrix W is used to hold only-principle components in the similar patches.

In step S1010, the similar patch correction unit 207 corrects the similar patches by projecting difference patches obtained by subtracting an average patch Q from similar patches $P_i$ using the projection matrix W and adding the average patch Q to a result of the projection. By this correction, patches $O_i$ which only have principle components and which have reduced noise are calculated. The process performed by the similar patch correction unit 207 is represented by Expression (10) below.

$$O_i = Q - W(P_i - Q) \qquad (10)$$

In step S1011, the patch combining unit 208 calculates a numerator image and a denominator image based on the similar patches corrected in step S1010. A concrete method thereof is the same as that employed in step S311 of the first embodimen.

In step S1012, it is determined whether an unprocessed target patch exists. When the determination is affirmative, the process returns to step S1003. When the determination is negative, the patch combining unit 208 divides the numerator image by the denominator image and outputs a resultant image before the process is terminated. The flow of the noise reduction process according to this embodiment has been described hereinabove.

As described above, in this embodiment, the threshold value Θ for selecting principle components is calculated based on the number N of similar patches, the number M of pixels in the patches, and the noise amount. The projection matrix B is calculated while eigenvectors corresponding to eigenvalues which are equal to or larger than the threshold value Θ relative to the covariance matrix C are set as the main components. Then noise in the similar patches is reduced using the projection matrix B. When the threshold value Θ is to be calculated, the eigenvectors corresponding to noise are reliably determined as noise, and therefore, the coefficient α becomes larger as the number M of pixels in the patches becomes larger and the coefficient α becomes smaller as the number N of similar patches becomes larger. By this, texture accidentally generated due to noise may be removed and generation of patterned noise may be efficiently suppressed. Note that, although values used in this embodiment as examples are preferable values, the present disclosure is not limited to this. For example, if the coefficient α is entirely set larger by 10%, the effect of reduction of patterned noise is further enhanced. However, when the noise reduction effect is enhanced, an image after the noise reduction may blur more or less. The appropriate coefficient α is set in advance taking this trade-off into consideration.

Other Embodiments

In the foregoing embodiments, the case where all pixels included in an input image are set as a target pixel is illustrated. However, the method is not limited to this. For example, target patches may be arranged in a tiled shape in an input image.

In the three embodiments described above, software which is realized when a computer program is operated is taken as an example. However, some or all of the components in the block diagrams of FIGS. 2A and 2B, FIGS. 6A and 6B, and FIGS. 9A and 9B may be realized by a dedicated image processing circuit.

Furthermore, the present disclosure is realized by a process of supplying a program which realizes at least one of the functions of the foregoing embodiments to a system or an apparatus through a network or a storage medium and reading and executing the program using at least one processor included in a computer of the system or the apparatus.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method preformed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2017-231082 filed Nov. 30, 2017, which is hereby incorporated by reference herein in its entirety.

What is claimed is:
1. An image processing apparatus comprising:
a processor coupled to a memory to perform operations including:
setting a target patch in an input image, wherein the set target patch includes a number of pixels corresponding to characteristics of a target pixel in the input image and a pixel group in a vicinity of the target pixel as the target patch relative to the target pixel,
detecting a plurality of similar patches which are similar to the target patch set in the input image, wherein the plurality of similar patches includes pixels,
calculating, as a matrix calculation, a covariance matrix representing correlation between pixels based on the detected plurality of similar patches,
calculating a plurality of eigenvalues and a plurality of eigenvectors of the calculated covariance matrix,
obtaining a noise amount in the input image,
deriving a correction matrix that is different from the calculated covariance matrix and, in a case where eigenvectors corresponding to eigenvalues which are larger than a threshold value, the derived correction matrix is based on the plurality of eigenvalues, the plurality of eigenvectors, the noise amount, a number of detected similar patches, the eigenvectors corresponding to the eigenvalues which are larger than the threshold value, and, in a case of correcting eigenvalues smaller than the threshold value, the corrected eigenvalues and eigenvectors corresponding to the corrected eigenvalues,
correcting, as a patch correction, values of pixels in at least one of the plurality of similar patches based on the derived correction matrix, and
generating an output image by combining the similar patches having pixels values corrected by the patch correction,
wherein the threshold value is set in accordance with the noise amount in the plurality of eigenvalues and the number of pixels included in the plurality of similar patches, and
wherein deriving includes correcting eigenvalues smaller than the threshold value and deriving the correction matrix based on the corrected eigenvalues and eigenvectors corresponding to the corrected eigenvalues.
2. The image processing apparatus according to claim 1, wherein the threshold value further is set based on the number of detected similar patches.
3. The image processing apparatus according to claim 1, wherein deriving includes correcting eigenvalues, which are equal to or smaller than the corrected eigenvalues, to values corresponding to the noise amount.
4. The image processing apparatus according to claim 1, wherein deriving includes setting the threshold value smaller as the number of detected similar patches is larger.
5. The image processing apparatus according to claim 1, wherein deriving includes correcting eigenvalues of the plurality of eigenvalues in accordance with the noise amount and the number of pixels included in the plurality of similar patches.
6. The image processing apparatus according to claim 1, wherein deriving includes setting the threshold value, selecting eigenvectors by comparing the threshold value with individual eigenvalues, and deriving the correction matrix using the selected eigenvectors.

7. The image processing apparatus according to claim 1, wherein deriving includes correcting eigenvalues using a function of converting an input eigenvalue into a corrected eigenvalue.

8. The image processing apparatus according to claim 7, wherein the function of converting the input eigenvalue into the corrected eigenvalue has a characteristic corresponding to noise variance and the number of detected similar patches.

9. The image processing apparatus according to claim 8, wherein deriving includes deriving a matrix represented by the following expression as the derived correction matrix:

$$H \equiv \sigma^2 (E_1 E_2 \ldots E_M)^t \, \mathrm{diag}(\eta_1^{-1}, \eta_2^{-1}, \ldots, \eta_M^{-1}) (E_1 E_2 \ldots E_M)$$

where H denotes the derived correction matrix, a denotes a noise amount in the input image, t denotes a matrix transpose operator, M represents the number of detected similar patches, diag represent a square matrix function, and $(E_1 \, E_2 \ldots E_M)$ denotes the plurality of eigenvectors corresponding to a plurality of corrected eigenvalues $(\eta_1^{-1}, \eta_2^{-1}, \ldots, \eta_M^{-1})$.

10. The image processing apparatus according to claim 9, wherein the patch correction includes correcting a processing target patch in accordance with the following expression:

$$O_i \equiv P_i - H(P_i - Q)$$

where i represents a number identifier of a patch to be corrected, $O_i$ denotes a corrected patch, $P_i$ denotes the processing target patch included in the plurality of similar patches, H denotes the derived correction matrix, and Q denotes an average patch generated by averaging a corresponding pixel group in the plurality of similar patches.

11. The image processing apparatus according to claim 1, wherein deriving includes calculating a projection matrix as the derived correction matrix using the plurality of eigenvectors and the plurality of eigenvalues.

12. The image processing apparatus according to claim 1, wherein obtaining includes storing, in a table, the noise amount corresponding to parameters obtained when an imaging apparatus captures the input image.

13. A method for an image processing apparatus, the method comprising:

setting a target patch in an input image, wherein the set target patch includes a number of pixels corresponding to characteristics of a target pixel in the input image and a pixel group in a vicinity of the target pixel as the target patch relative to the target pixel;

detecting a plurality of similar patches which are similar to the target patch set in the input image, wherein the plurality of similar patches includes pixels;

calculating, as a matrix calculation, a covariance matrix representing correlation between pixels based on the detected plurality of similar patches;

calculating a plurality of eigenvalues and a plurality of eigenvectors of the calculated covariance matrix;

obtaining a noise amount in the input image;

deriving a correction matrix that is different from the calculated covariance matrix and, in a case where eigenvectors corresponding to eigenvalues which are larger than a threshold value, the derived correction matrix is based on the plurality of eigenvalues, the plurality of eigenvectors, the noise amount, a number of detected similar patches, the eigenvectors corresponding to the eigenvalues which are larger than the threshold value, and, in a case of correcting eigenvalues smaller than the threshold value, the corrected eigenvalues and eigenvectors corresponding to the corrected eigenvalues;

correcting, as a patch correction, values of pixels in at least one of the plurality of similar patches based on the derived correction matrix; and generating an output image by combining the similar patches having pixels values corrected by the patch correction, wherein the threshold value is set in accordance with the noise amount in the plurality of eigenvalues and the number of pixels included in the plurality of similar patches, and wherein deriving includes correcting eigenvalues smaller than the threshold value and deriving the correction matrix based on the corrected eigenvalues and eigenvectors corresponding to the corrected eigenvalues.

14. A non-transitory computer-readable storage medium storing a program to cause a computer to perform a method for an image processing apparatus, the method comprising:

setting a target patch in an input image, wherein the set target patch includes a number of pixels corresponding to characteristics of a target pixel in the input image and a pixel group in a vicinity of the target pixel as the target patch relative to the target pixel;

detecting a plurality of similar patches which are similar to the target patch set in the input image, wherein the plurality of similar patches includes pixels;

calculating, as a matrix calculation, a covariance matrix representing correlation between pixels based on the detected plurality of similar patches;

calculating a plurality of eigenvalues and a plurality of eigenvectors of the calculated covariance matrix;

obtaining a noise amount in the input image;

deriving a correction matrix that is different from the calculated covariance matrix and, in a case where eigenvectors corresponding to eigenvalues which are larger than a threshold value, the derived correction matrix is based on the plurality of eigenvalues, the plurality of eigenvectors, the noise amount, a number of detected similar patches, the eigenvectors corresponding to the eigenvalues which are larger than the threshold value, and, in a case of correcting eigenvalues smaller than the threshold value, the corrected eigenvalues and eigenvectors corresponding to the corrected eigenvalues;

correcting, as a patch correction, values of pixels in at least one of the plurality of similar patches based on the derived correction matrix; and generating an output image by combining the similar patches having pixels values corrected by the patch correction, wherein the threshold value is set in accordance with the noise amount in the plurality of eigenvalues and the number of pixels included in the plurality of similar patches, and wherein deriving includes correcting eigenvalues smaller than the threshold value and deriving the correction matrix based on the corrected eigenvalues and eigenvectors corresponding to the corrected eigenvalues.

15. An image processing apparatus comprising:

a processor coupled to a memory to perform operations including:

setting a target patch in an input image, detecting a plurality of similar patches which are similar to the target patch set in the input image, wherein the plurality of similar patches includes pixels, calculating, as a matrix calculation, a covariance matrix representing correlation between pixels based on the detected plurality of similar patches, calculating a plurality of eigenvalues and a plurality of eigenvectors of the calculated covariance matrix, obtaining a noise amount in the input image, (i) setting a threshold value that is in accordance with the noise amount and a number of detected similar patches and is used for determining a correction amount of the plurality of eigenvalues and (ii) deriving a correction matrix based on the eigenvectors corresponding to the eigenvalues which are larger than the threshold value, wherein the derived correction matrix is different from the calculated covariance matrix and is used for correcting the eigenvalues, correcting, as a patch correction, values of pixels in at least one of the plurality of similar patches based on the derived correction matrix, and generating an output image by combining the similar patches having pixels values corrected by the patch correction, wherein the threshold value is set in accordance with the noise amount in the plurality of eigenvalues and the number of pixels included in the plurality of similar patches, and wherein deriving includes correcting eigenvalues smaller than the threshold value and deriving the correction matrix based on the corrected eigenvalues and eigenvectors corresponding to the corrected eigenvalues.

16. A method for an image processing apparatus, the method comprising:

setting a target patch in an input image;

detecting a plurality of similar patches which are similar to the target patch set in the input image, wherein the plurality of similar patches includes pixels;

calculating, as a matrix calculation, a covariance matrix representing correlation between pixels based on the detected plurality of similar patches;

calculating a plurality of eigenvalues and a plurality of eigenvectors of the calculated covariance matrix;

obtaining a noise amount in the input image;

(i) setting a threshold value that is in accordance with the noise amount and a number of detected similar patches and is used for determining a correction amount of the plurality of eigenvalues and (ii) deriving a correction matrix based on the eigenvectors corresponding to the eigenvalues which are larger than the threshold value, wherein the derived correction matrix is different from the calculated covariance matrix and is used for correcting the eigenvalues;

correcting, as a patch correction, values of pixels in at least one of the plurality of similar patches based on the derived correction matrix; and generating an output image by combining the similar patches having pixels values corrected by the patch correction, wherein the threshold value is set in accordance with the noise amount in the plurality of eigenvalues and the number of pixels included in the plurality of similar patches, and wherein deriving includes correcting eigenvalues smaller than the threshold value and deriving the correction matrix based on the corrected eigenvalues and eigenvectors corresponding to the corrected eigenvalues.

17. A non-transitory computer-readable storage medium storing a program to cause a computer to perform a method for an image processing apparatus, the method comprising:

setting a target patch in an input image;

detecting a plurality of similar patches which are similar to the target patch set in the input image, wherein the plurality of similar patches includes pixels;

calculating, as a matrix calculation, a covariance matrix representing correlation between pixels based on the detected plurality of similar patches;

calculating a plurality of eigenvalues and a plurality of eigenvectors of the calculated covariance matrix;

obtaining a noise amount in the input image;

(i) setting a threshold value that is in accordance with the noise amount and a number of detected similar patches and is used for determining a correction amount of the plurality of eigenvalues and (ii) deriving a correction matrix based on the eigenvectors corresponding to the eigenvalues which are larger than the threshold value, wherein the derived correction matrix is different from the calculated covariance matrix and is used for correcting the eigenvalues;

correcting, as a patch correction, values of pixels in at least one of the plurality of similar patches based on the derived correction matrix; and generating an output image by combining the similar patches having pixels values corrected by the patch correction, wherein the threshold value is set in accordance with the noise amount in the plurality of eigenvalues and the number of pixels included in the plurality of similar patches, and wherein deriving includes correcting eigenvalues smaller than the threshold value and deriving the correction matrix based on the corrected eigenvalues and eigenvectors corresponding to the corrected eigenvalues.

\* \* \* \* \*